United States Patent
Peng et al.

(10) Patent No.: US 9,881,321 B2
(45) Date of Patent: Jan. 30, 2018

(54) METHOD FOR IDENTIFYING BUNDLED SOFTWARE AND APPARATUS THEREFOR

(71) Applicant: iYuntian Co., Ltd., Beijing (CN)

(72) Inventors: Yunpeng Peng, Beijing (CN); Ling Guo, Beijing (CN)

(73) Assignee: IYUNTIAN CO., LTD., Beijing (CN)

( * ) Notice: Subject to any disclaimer, the term of this patent is extended or adjusted under 35 U.S.C. 154(b) by 51 days.

(21) Appl. No.: 14/586,875

(22) Filed: Dec. 30, 2014

(65) Prior Publication Data
US 2015/0379572 A1    Dec. 31, 2015

(30) Foreign Application Priority Data

Jun. 30, 2014 (CN) .......................... 2014 1 0305946

(51) Int. Cl.
| | | |
|---|---|---|
| *G06F 9/44* | (2006.01) | |
| *G06F 9/445* | (2006.01) | |
| *G06Q 30/02* | (2012.01) | |

(52) U.S. Cl.
CPC .......... *G06Q 30/0256* (2013.01); *G06F 8/61* (2013.01); *G06Q 30/0276* (2013.01); *G06F 8/71* (2013.01)

(58) Field of Classification Search
CPC .......... G06Q 30/0276; G06Q 30/0256; G06Q 17/30657; G06F 8/61–8/68
See application file for complete search history.

(56) References Cited

U.S. PATENT DOCUMENTS

| | | | |
|---|---|---|---|
| 8,583,672 B1* | 11/2013 | Paskin | ................ G06F 17/3064 707/765 |
| 2004/0139177 A1* | 7/2004 | Yook | ........................ G06F 8/61 709/220 |

(Continued)

FOREIGN PATENT DOCUMENTS

| | | |
|---|---|---|
| JP | 2012-48565 A | 3/2012 |
| KR | 10-2012-0140569 A | 12/2012 |

OTHER PUBLICATIONS

Fuze Sun, An Universal Automatic Configuration Software Model Based on the Cloud Computing, 2013, pp. 1-6. http://ieeexplore.ieee.org/stamp/stamp.jsp?arnumber=6823963.*

(Continued)

*Primary Examiner* — Thuy Dao
*Assistant Examiner* — Mongbao Nguyen
(74) *Attorney, Agent, or Firm* — Orrick, Herrington & Sutcliffe LLP

(57) ABSTRACT

A method for identifying bundled software and an apparatus therefor. The method comprises: detecting a user interface for software installation; acquiring text information on the user interface; determining whether bundled software exists; and, based upon the determination, extracting the name and amount of bundled software from the text information and prompting the name and the amount of the bundled software. The embodiments may identify bundled software before installing software and avoid starting the bundled software process, having the effect of anti-bundling on the bundled software in advance. By extracting the name of the bundled software, acquiring the amount of bundled software, and prompting the name and amount of the bundled software, a user is able to determine whether to install the bundled software according to his or her requirements, thereby (Continued)

improving the autonomous right of selection of the user in the process of installing software.

20 Claims, 5 Drawing Sheets

(56) References Cited

U.S. PATENT DOCUMENTS

| | | | | |
|---|---|---|---|---|
| 2006/0143601 A1* | 6/2006 | Concha | ............... | G06F 8/61 717/170 |
| 2009/0276755 A1* | 11/2009 | Beltowski | ............... | G06F 8/61 717/118 |
| 2009/0276769 A1* | 11/2009 | Brannen, Jr. | ............... | G06F 8/61 717/174 |
| 2011/0113327 A1* | 5/2011 | Hagelund | ............... | G06F 9/4448 715/265 |
| 2012/0005626 A1* | 1/2012 | Wong | ............... | G06F 17/30967 715/823 |
| 2012/0084752 A1* | 4/2012 | Arnold | ............... | G06F 8/63 717/121 |
| 2013/0061217 A1* | 3/2013 | Charters | ............... | G06F 8/61 717/174 |
| 2013/0111458 A1* | 5/2013 | Quin | ............... | G06F 8/68 717/172 |
| 2013/0311271 A1* | 11/2013 | Agrawal | ............... | G06Q 30/02 705/14.45 |
| 2013/0332901 A1* | 12/2013 | Berg | ............... | G06F 8/71 717/121 |
| 2013/0337793 A1* | 12/2013 | Prakash | ............... | H04W 8/22 455/418 |
| 2014/0172782 A1* | 6/2014 | Schuenzel | ............... | H04L 67/325 707/609 |
| 2014/0357357 A1* | 12/2014 | Boyd | ............... | A63F 13/00 463/31 |
| 2014/0359592 A1* | 12/2014 | Phaedrus | ............... | G06F 8/65 717/168 |
| 2014/0359601 A1* | 12/2014 | Constable | ............... | G06F 8/61 717/175 |
| 2014/0359604 A1* | 12/2014 | Salameh | ............... | G06F 8/61 717/177 |
| 2014/0359606 A1* | 12/2014 | Salameh | ............... | G06F 8/61 717/178 |
| 2015/0039431 A1* | 2/2015 | Sarshar | ............... | G06Q 30/0256 705/14.54 |
| 2015/0113375 A1* | 4/2015 | Li | ............... | G06F 3/0482 715/205 |
| 2015/0178808 A1* | 6/2015 | Grossman | ............... | G06Q 50/22 705/14.54 |
| 2015/0178861 A1* | 6/2015 | Gordon | ............... | G06Q 10/103 705/301 |
| 2015/0193215 A1* | 7/2015 | Jianu | ............... | G06F 8/61 717/177 |
| 2015/0254731 A1* | 9/2015 | Ohayon | ............... | G06Q 30/0276 705/14.66 |

OTHER PUBLICATIONS

Tao Wang, Component Monitoring of OSGi-based Software, 2010, pp. 1-6. http://ieeexplore.ieee.org/stamp/stamp.jsp?arnumber=5704324.*

Zong Chun-mei, Applying Data Mining Techniques in Software Development, 2010, pp. 1-4. http://ieeexplore.ieee.org/stamp/stamp.jsp?arnumber=5477841.*

* cited by examiner

METHOD FOR IDENTIFYING BUNDLED SOFTWARE AND APPARATUS THEREFOR

CROSS-REFERENCE TO RELATED APPLICATIONS

The present application claims priority to Chinese Patent Application No. CN201410305946.9, filed on Jun. 30, 2014, the entire disclosure of which is incorporated herein by reference in its entirety and for all purposes.

TECHNICAL FIELD

The present invention relates to the technical field of Internet networks, and in particular to a method for identifying bundled software and an apparatus therefor.

BACKGROUND

In order to promote the sales of their software, software developers will expand their marketing channels as far as possible, and by bundling the software with other software, when other software is installed, and in the case where a user directly clicks to install the software by default, the bundled software will be installed on the user's computer without the user knowing.

In the prior art, relevant information about a new process is learned by means of an event of capturing the process of a currently installed program and then creating a new process for bundled software, and whether the new process is bundled software will be determined by means of the relevant information about the new process. However, the means of identifying the new process of the bundled software in the prior art can identify the bundled software after starting the bundled software process, and therefore, system resources are occupied, anti-bundling on the bundled software in advance cannot be performed, and information such as the name, purpose, etc. about the bundled software cannot be identified.

SUMMARY

The embodiments of the present invention provide a method for identifying bundled software and an apparatus therefor, and bundled software is identified before a user installs software, thereby having the effect of anti-bundling.

In order to achieve the above objective, the embodiments of the present invention adopt the following technical solutions:

a method for identifying bundled software, the method for identifying bundled software comprising:
  detecting a user interface for software installation, and acquiring text information on the user interface;
  determining whether bundled software exists by matching the text information with preset text indicating software bundling; and
  if it is determined that bundled software exists, then extracting the name of the bundled software and the amount of bundled software from the text information, and prompting the name and amount of the bundled software.

An apparatus for identifying bundled software, the apparatus for identifying bundled software comprises:
  a text detection module for detecting a user interface for software installation, and acquiring text information on the user interface of software to be installed;
  a text matching module for determining whether bundled software exists by matching the text information with preset text indicating software bundling; and
  a first acquisition module for, if it is determined that bundled software exists, then extracting the name of the bundled software and acquiring the amount of bundled software from the text information, and prompting the name and amount of the bundled software.

The method for identifying bundled software and apparatus therefor provided in the embodiments of the present invention identify bundled software before installing the software to be installed and avoid starting the bundled software process, having the effect of anti-bundling on the bundled software in advance; by extracting the name of the bundled software and acquiring the amount of bundled software, and prompting the name and amount of the bundled software, a user is able to determine whether to install the bundled software according to his/her requirements, thereby improving the autonomous right of selection of the user in the process of installing software.

DETAILED DESCRIPTION OF THE PREFERRED EMBODIMENTS

What is provided in the embodiments of the present invention will be described in detail below in conjunction with the accompanying drawings.

Figure 1:
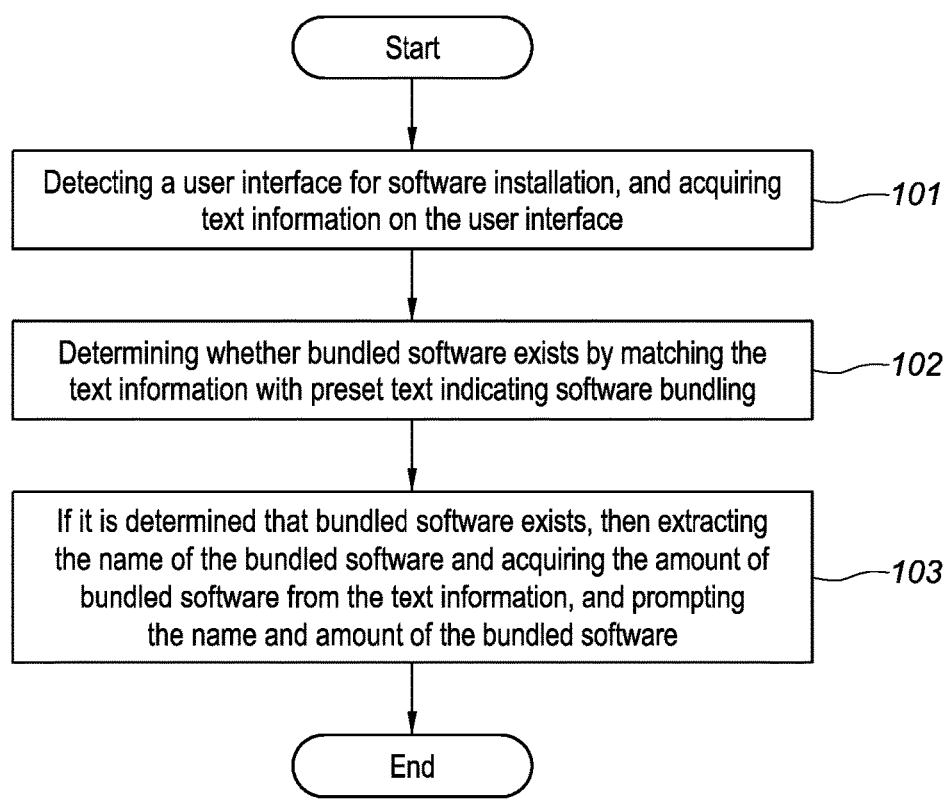
FIG. 1 is a schematic flowchart of a method for identifying bundled software provided in one embodiment of the present invention.

FIG. 1 is a schematic flowchart of a method for identifying bundled software provided in one embodiment of the present invention; and as shown in FIG. 1, the method for identifying bundled software provided in the embodiment of the present invention specifically comprises:
  step 101, detecting a user interface for software installation, and acquiring text information on the user interface;
  step 102, determining whether bundled software exists by matching the text information with preset text indicating software bundling; and
  step 103, if it is determined that bundled software exists, then extracting the name of the bundled software and acquiring the amount of bundled software from the text information, and prompting the name and amount of the bundled software.

The method for identifying bundled software provided in the embodiments of the present invention identifies bundled software before installing the software to be installed and avoids starting the bundled software process, having the effect of anti-bundling on the bundled software in advance; by extracting the name of the bundled software and acquiring the amount of bundled software, and prompting the name and amount of the bundled software, a user is able to determine whether to install the bundled software according to his/her requirements, thereby improving the autonomous right of selection of the user in the process of installing software.

Figure 2:
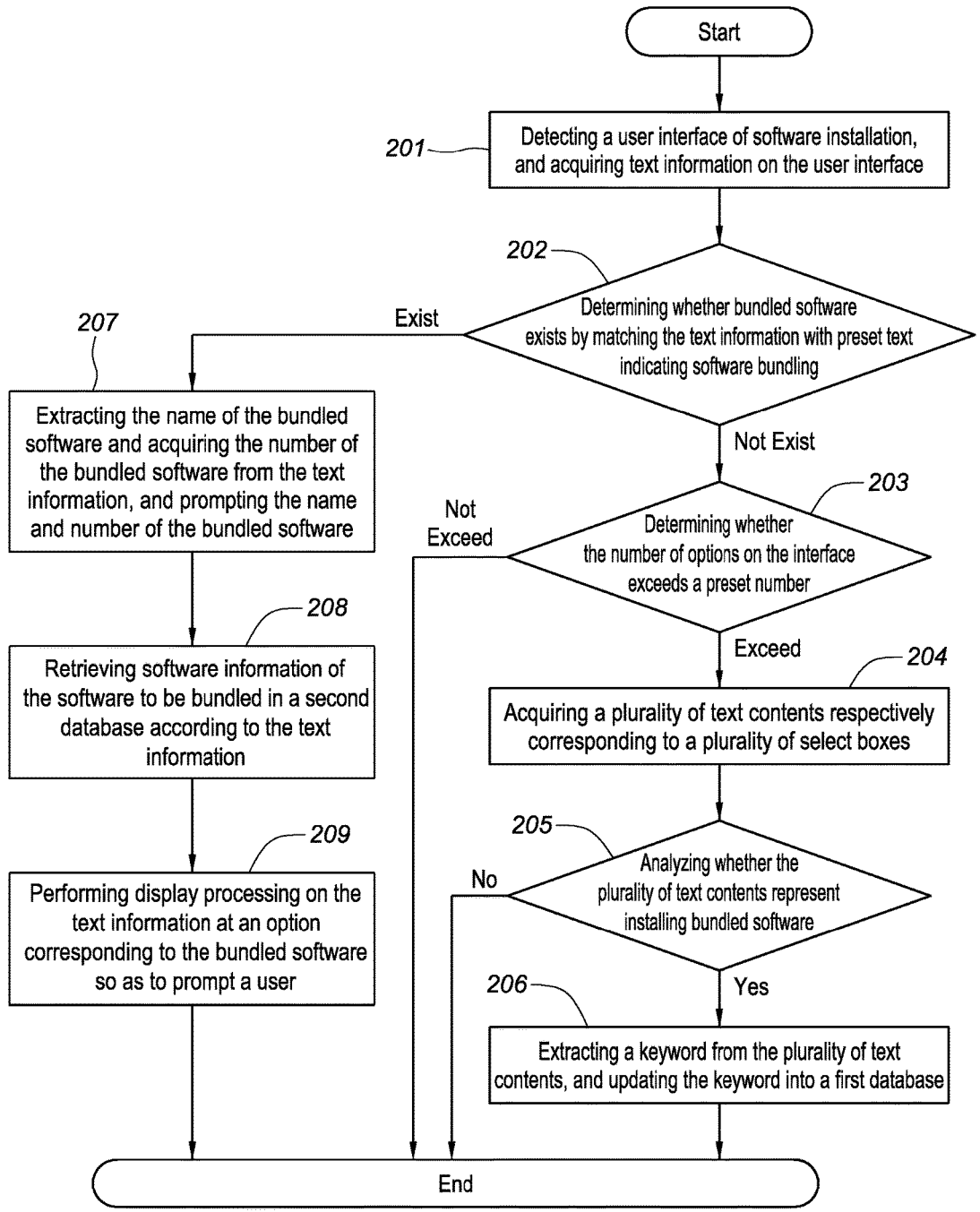
FIG. 2 is a schematic flowchart of a method for identifying bundled software provided in another embodiment of the present invention.
Figure 3:
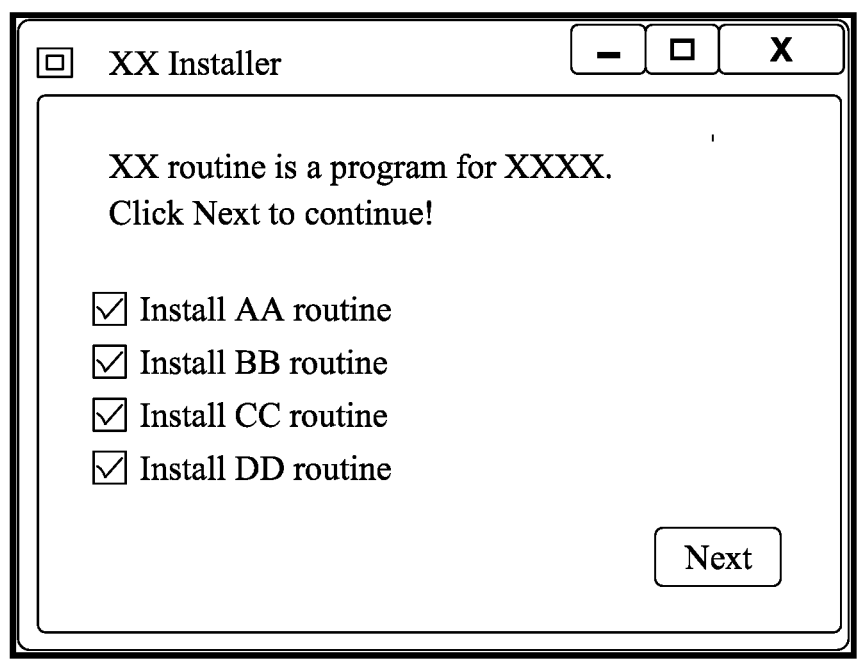
FIG. 3 is a schematic diagram of an interface for prompting about bundled software in step 201 of the embodiment shown in FIG. 2.
Figure 4:
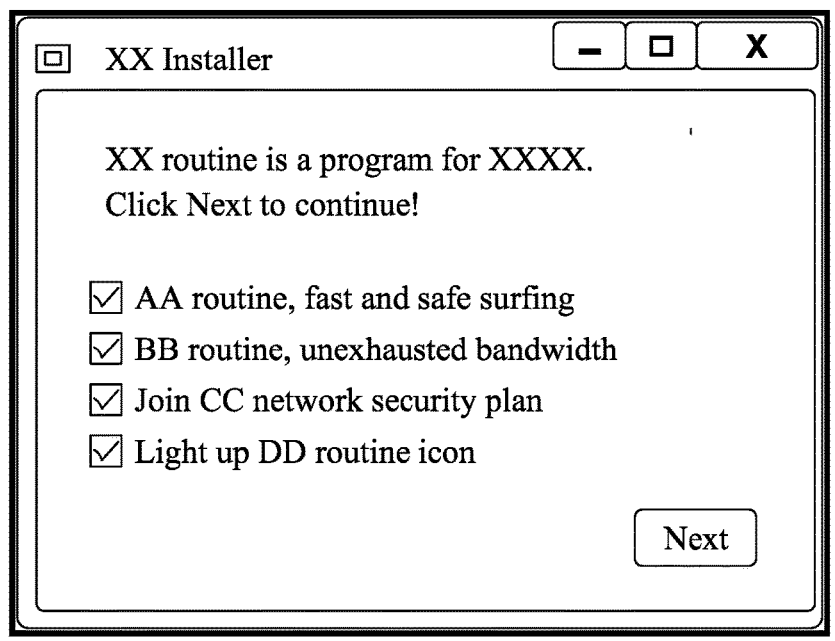
FIG. 4 is a schematic diagram of an interface for prompting about bundled software in step 203 of the embodiment shown in FIG. 2.

FIG. 2 is a schematic flowchart of a method for identifying bundled software provided in another embodiment of the present invention; FIG. 3 is a schematic diagram of an interface for prompting about bundled software in step 201 of the embodiment shown in FIG. 2; FIG. 4 is a schematic diagram of an interface for prompting about bundled software in step 203 of the embodiment shown in FIG. 2; and as shown in FIG. 2, the method for identifying bundled software provided in the embodiment of the present invention specifically comprises:

step 201, a user interface for software installation is detected, and text information on the user interface is acquired.

Specifically, as shown in FIG. 3, on a user interface of software to be installed, options such as "install AA program", "install BB program", "use CC program" and "use DD program" exist, and by carrying out step 201, the above-mentioned text information on the interface of the software to be installed may be acquired.

Step 202, whether bundled software exists is determined by matching the text information with preset text indicating software bundling; and if bundled software does not exist, step 203 is carried out; and if bundled software exists, step 207 is carried out.

Specifically, as shown in FIG. 3, text information such as "install AA program", "install BB program", "use CC program" and "use DD program" is matched with preset text, and the preset text is, for example, "install", "use", etc., and the text information on the interface is matched with the preset text so that it can be determined that bundled software exists on the installed software. In addition, the preset text may also be the name of the bundled software, and the name of the bundled software may be defined according to the purpose or an attribute of the corresponding bundled software. Certainly, those skilled in the art may understand that FIG. 3 is merely an example, and if bundled software does not exist on the interface, it is also necessary to combine with a selection box on the interface of the software to be installed for further judgment.

Step 203, the selection box on the interface of the software to be installed is detected, and whether the number of options on the interface exceeds a preset number is determined, and if so, step 204 is carried out, and if not, the flow ends.

Specifically, in the case of not detecting the bundled software through step 202, since in a normal case, except for information about confirming the installation type of the software to be installed, etc. in a selection box on the user interface in the installation process, the number of selection boxes on the interface is usually not too large, and therefore, the number of selection boxes on the interface may be detected to further determine whether there is bundled software. As shown in FIG. 4, the interface of the bundled software does not have preset text such as "install" and "use", and at this point it is necessary to perform further judgment by detecting the number of selection boxes on the interface. Furthermore, the selection box may specifically be any combination of a checkbox and a combobox, for example, it may be a plurality of checkboxes or a plurality of comboboxes, and may also be a combination of a plurality of checkboxes and a plurality of comboboxes, and may also be a combination of a checkbox and a plurality of comboboxes; therefore, those skilled in the art may understand that the embodiment of the present invention does not define the specific combination means of the checkbox and the combobox. In one embodiment, it is detected that there are 4 selection boxes on the interface, while the preset number is 1, and in the case where the number of selection boxes actually existing on the interface is greater than the preset number 1, then it may be determined that bundled software exists.

Step 204, a plurality of text contents respectively corresponding to a plurality of selection boxes are acquired, and step 205 is carried out.

As shown in FIG. 4, through step 204, text contents respectively corresponding to 4 selection boxes on the interface may be acquired, for example, "AA program, faster and securer Internet surfing", "BB program, limitless network traffic", "join CC network security plan" and "light up DD program icon".

Step 205, whether the plurality of text contents represent installation of bundled software is analyzed, and if so, step 206 is carried out, and if not, the flow ends.

By means of analyzing the text contents acquired in the above-mentioned step 204, whether "AA program", "BB program", "CC network security", "DD program", etc. are bundled software is further determined.

Step 206, a keyword is extracted from the plurality of text contents, and the keyword is updated into a first database, and the flow ends.

After the analysis through the above-mentioned step 205, "AA program", "BB program", "CC network security", "DD program", etc. are updated into the first database as keywords, and by means of updating the first database, preset text may be obtained from the first database when the above-mentioned step 201 is carried out, such that a self-learning process of the database where the preset text is located may be implemented and the accuracy of identifying bundled software may be improved.

Step 207, the name of the bundled software is extracted and the amount of bundled software is acquired from the text information, and the name and amount of the bundled software are prompted, and step 208 is carried out.

For example, in the above-mentioned step 201, after it is determined that bundled software exists, by means of extracting "AA", "BB", "CC" and "DD" from the text contents "install AA program", "install BB program", "use CC program" and "use DD program", the name of the bundled software may be learned and the amount of bundled software may be acquired.

In step 207, the name of the bundled software and the amount of bundled software acquired may be prompted by way of popping up a dialog box.

Step 208, software information of the software to be bundled is retrieved in a second database according to the name of the bundled software, and the software information of the software to be bundled is retrieved in the second database, and step 209 is carried out.

Specifically, the second database may be a set software management software library or an encyclopedia database provided by a network service provider, and introduction (for example, the version, company and function of the software to be bundled) to the software to be bundled may be displayed by means of retrieving the software to be bundled in the second database, so that a user can refer thereto and decide whether to install the bundled software.

Step 209, display processing is performed on the text information at an option corresponding to the bundled software so as to prompt a user, and the flow ends.

Specifically, the display processing may in particular be performing highlight or color changing color processing on the text information corresponding to the bundled software so as to attract the attention of the user.

The method for identifying bundled software provided in the embodiments of the present invention identifies bundled software before installing the software to be installed and avoids starting the bundled software, having the effect of anti-bundling on the bundled software in advance; by acquiring the name of the bundled software and the amount of bundled software, and prompting the name and amount of the bundled software, a user is able to determine whether to install the bundled software according to his/her requirements, thereby improving the autonomous right of selection of the user in the process of installing software.

Figure 5:
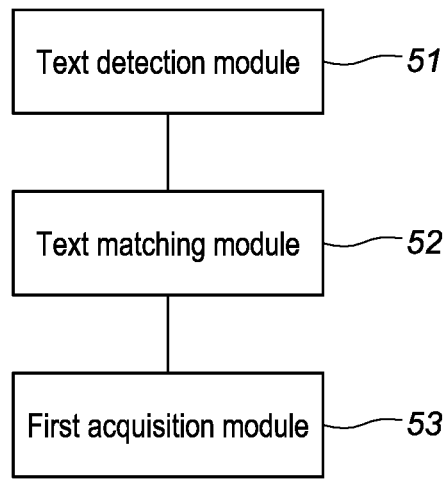
FIG. 5 is a schematic diagram of the structure of an apparatus for identifying bundled software provided in one embodiment of the present invention.

FIG. 5 is a schematic diagram of the structure of an apparatus for identifying bundled software provided in one embodiment of the present invention; and as shown in FIG. 5, the apparatus for identifying bundled software provided in the embodiment of the present invention specifically comprises:

a text detection module 51 for detecting a user interface for software installation, and acquiring text information on the user interface of software to be installed;

a text matching module 52 for determining whether bundled software exists by matching the text information with preset text indicating software bundling; and a first acquisition module 53 for, if it is determined that bundled software exists, then extracting the name of the bundled software and acquiring the amount of bundled software from the text information, and prompting the name and amount of the bundled software.

The beneficial technical effects of the embodiments of the present invention may refer to the beneficial technical effects of the embodiment as shown in FIG. 1 above, which will not be described here again redundantly.

Figure 6:
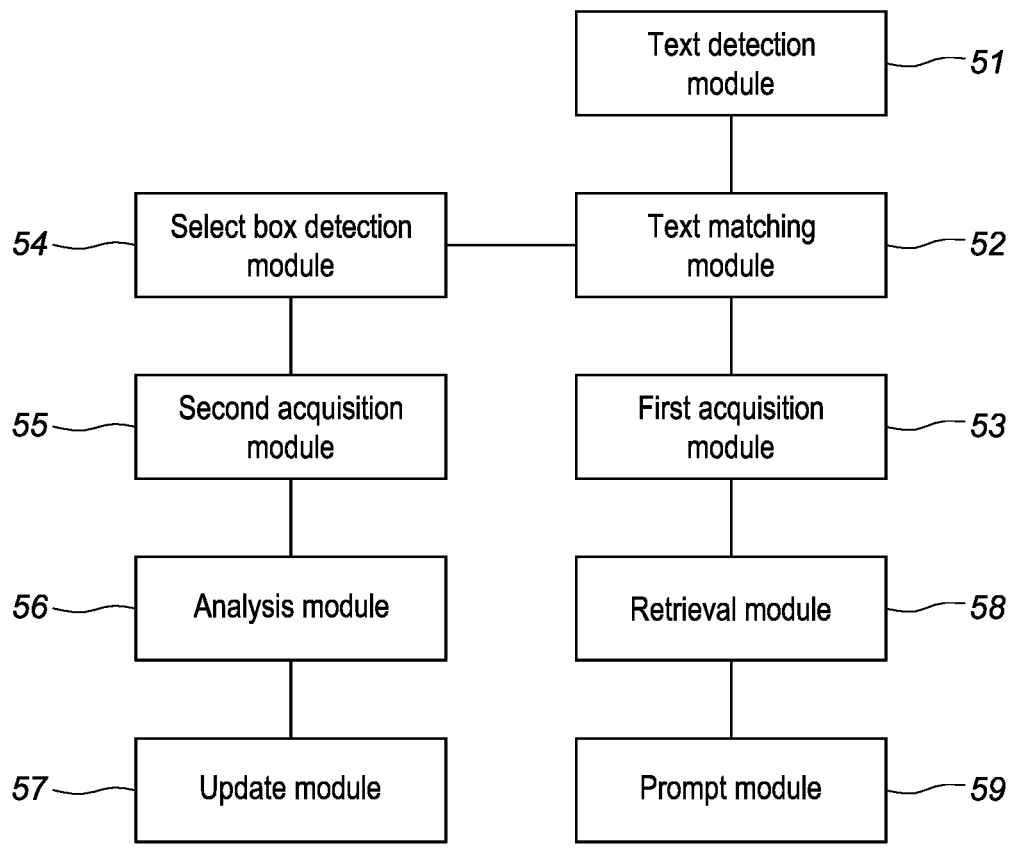
FIG. 6 is a schematic diagram of the structure of an apparatus for identifying bundled software provided in another embodiment of the present invention.

FIG. 6 is a schematic diagram of the structure of an apparatus for identifying bundled software provided in another embodiment of the present invention; and as shown in FIG. 6, on the basis of the embodiment as shown in FIG. 5 above, the apparatus for identifying bundled software provided in the embodiment of the present invention may further comprise:

a selection box detection module 54 for, if it is determined that the bundled software does not exist, detecting a selection box on the user interface of the software to be installed;

a second acquisition module 55 for, if the number of selection boxes on the user interface exceeds a preset number, then acquiring a plurality of text contents respectively corresponding to a plurality of selection boxes;

an analysis module 56 for analyzing whether the plurality of text contents are the bundled software; and an update module 57 for, if the plurality of text contents represent installing the bundled software, then extracting a keyword from the plurality of text contents, and updating the keyword into a first database.

A retrieval module 58 is used for retrieving software information of the software to be bundled in a second database according to the name of the bundled software.

A prompt module 59 is used for performing display processing on the text information at an option corresponding to the bundled software so as to prompt a user.

The beneficial technical effects of the embodiments of the present invention may refer to the beneficial technical effects of the embodiments as shown in FIGS. 2-4 above, which will not be described here again redundantly.

Aspects of various embodiments are specified in the claims. Those and other aspects of various embodiments and specified in the following numbered clauses:

1. A method for identifying bundled software, characterized in that said method for identifying bundled software comprises:
   detecting a user interface for software installation, and acquiring text information on said user interface;
   determining whether bundled software exists by matching said text information with preset text indicating software bundling; and
   if it is determined that said bundled software exists, then extracting the name of said bundled software and acquiring the amount of said bundled software from said text information, and prompting the name and the amount of said bundled software.

2. The method for identifying bundled software according to clause 1, characterized in that if it is determined that said bundled software does not exist, said method for identifying bundled software further comprises:
   detecting a selection box on said user interface; and
   if the number of selection boxes on said user interface exceeds a preset number, then acquiring a plurality of text contents respectively corresponding to a plurality of selection boxes.

3. The method for identifying bundled software according to clause 2, characterized in that said method for identifying bundled software further comprises:
   analyzing whether said plurality of text contents represent installation of the bundled software; and
   if said plurality of text contents represent installation of said bundled software, then extracting a keyword from said plurality of text contents, and updating said keyword into a first database.

4. The method for identifying bundled software according to clause 1, characterized in that said method for identifying bundled software further comprises:
   retrieving software information of said software to be bundled in a second database according to the name of said bundled software.

5. The method for identifying bundled software according to any one of clauses 1-4, characterized in that said method for identifying bundled software further comprises:
   performing display processing on said text information at an option corresponding to the bundled software so as to prompt a user.

6. An apparatus for identifying bundled software, characterized in that said apparatus for identifying bundled software comprises:
   a text detection module for detecting a user interface for software installation, and acquiring text information on the user interface of said software to be installed;
   a text matching module for determining whether bundled software exists by matching said text information with preset text indicating software bundling; and
   a first acquisition module for, if it is determined that said bundled software exists, then extracting the name of said bundled software and acquiring the amount of said bundled software from said text information, and prompting the name and the amount of said bundled software.

7. The apparatus for identifying bundled software according to clause 6, characterized in that said apparatus for identifying bundled software further comprises:
a selection box detection module for, if it is determined that said bundled software does not exist, detecting a selection box on the user interface of said software to be installed; and
a second acquisition module for, if the number of selection boxes on said user interface exceeds a preset number, then acquiring a plurality of text contents respectively corresponding to a plurality of selection boxes.

8. The apparatus for identifying bundled software according to clause 7, characterized in that said apparatus for identifying bundled software further comprises:
an analysis module for analyzing whether said plurality of text contents represent installation of the bundled software; and
an update module for, if said plurality of text contents represent installation of said bundled software, then extracting a keyword from said plurality of text contents, and updating said keyword into a first database.

9. The apparatus for identifying bundled software according to clause 6, characterized in that said apparatus for identifying bundled software further comprises:
a retrieval module for retrieving software information of said software to be bundled in a second database according to the name of said bundled software.

10. The apparatus for identifying bundled software according to any one of clauses 6-9, characterized in that said apparatus for identifying bundled software further comprises:
a prompt module for performing display processing on said text information at an option corresponding to the bundled software so as to prompt a user.

What are described above are only specific implementations of the present invention; however, the scope of protection of the present invention is not limited to this. Variations or replacements readily conceivable to those skilled in the art within the technical scope disclosed in the present invention should fall within the scope of protection of the present invention. Therefore, the scope of protection of the present invention shall be subject to the scope of protection of the claims.

What is claimed is:

1. A method for identifying bundled software being bundled with software to be installed on a computer, the method being performed by software instruction executed by a processor of the computer, comprising:
detecting a user interface being displayed via the computer and associated with an installation process for the software to be installed on the computer;
acquiring text information on the user interface;
determining whether the bundled software is bundled with the software to be installed based on the text information, the bundled software including at least one bundled software program; and
prompting a name and a number of the at least one bundled software program by displaying the name and the number on the computer based upon said determining,
wherein, upon determining that the bundled software does not exist based upon the text information, the method further includes:
detecting one or more selection boxes on the user interface;
determining whether a number of the selection boxes on the user interface exceeds a predetermined number;
acquiring a plurality of text contents corresponding to the selection boxes based upon a determination that the number of the selection boxes exceeds the predetermined number;
analyzing whether the plurality of text contents represent installation of the bundle software; and
based upon said analyzing, extracting a keyword from the plurality of text contents, and updating the keyword into a first database.

2. The method of claim 1, wherein said determining whether the bundled software is bundled with the software to be installed includes determining whether the bundled software exists by matching the text information with preset text indicating software bundling.

3. The method of claim 1, wherein said prompting includes:
extracting the name of the at least one bundled software program from the text information; and
acquiring the number of the at least one bundled software program from the text information.

4. The method of claim 1, further comprising retrieving software information of the at least one bundled software program in a second database according to the name of the at least one bundled software program.

5. The method of claim 1, further comprising performing display processing on the text information at an option corresponding to the bundled software to present a user prompt.

6. The method of claim 1, wherein said determining whether the bundled software is bundled with the software to be installed includes determining whether the bundled software is bundled by matching the text information with preset text indicating software bundling, wherein the preset text includes a text string of "install", a text string of "use", a name of the at least one bundle software program, or a combination thereof.

7. The method of claim 1, further comprising:
determining whether the number of the selection boxes on the user interface exceeds one; and
acquiring the plurality of text contents corresponding to the selection boxes based upon determining that the number of selection boxes exceeds one.

8. An apparatus for identifying bundled software being bundled with software to be installed on a computer, comprising:
a processor; and
a computer storage medium having one or more programs stored thereon for instructing said processor to:
detect a user interface being displayed via the computer and associated with an installation process for the software to be installed on the computer and acquire text information on the user interface;
generate a determination whether the bundled software is bundled with the software to be installed based on the text information, the bundled software including at least one bundled software program; and
prompt a name and a number of the at least one bundled software program by displaying the name and the number on the computer upon based upon the determination, wherein, based upon a determination that the bundled software does not exist based upon the text information, the one or more programs instruct said processor to:
  detect one or more selection boxes on the user interface;
  determine whether a number of the selection boxes on the user interface exceeds a predetermined number;
  acquire a plurality of text contents corresponding to the selection boxes based upon a determination that the number of the selection boxes exceeds the predetermined number;
  analyze whether the plurality of text contents represent installation of the bundle software; and
  based upon the analyzing, extract a keyword from the plurality of text contents, and update the keyword into a first database.

9. The apparatus of claim 8, wherein said processor is configured to generate the determination whether the bundled software is bundled with the software to be installed by matching the text information with preset text indicating software bundling.

10. The apparatus of claim 8, wherein said processor is configured to extract the name of the at least one bundled software program and acquire the number of the at least one bundled software program from the text information.

11. The apparatus of claim 8, wherein the one or more programs instruct said processor to retrieve software information of the at least one bundled software program in a second database according to the name of the at least one bundled software program.

12. The apparatus of claim 8, wherein the one or more programs instruct said processor to perform display processing on the text information at an option corresponding to the bundled software to present a user prompt.

13. The apparatus of claim 8, wherein the one or more programs instruct said processor to determine whether the bundled software exists by matching the text information with preset text indicating software bundling, wherein the preset text includes a text string of "install", a text string of "use", a name of the at least one bundle software program, or a combination thereof.

14. The apparatus of claim 8, wherein the one or more programs instruct said processor to:
  determine whether the number of the selection boxes on the user interface exceeds one; and
  acquire a plurality of text contents corresponding to the selection boxes upon determining that the number of selection boxes exceeds one.

15. A non-transitory computer storage medium including at least one program for identifying bundled software being bundled with software to be installed on a computer, the at least one program instructing a processor to:
  detect a user interface being displayed via the computer and associated with an installation process for the software to be installed on the computer;
  acquire text information on the user interface;
  determine whether bundled software is bundled with the software to be installed based on the text information, the bundled software including at least one bundled software program;
  prompt the name and the number of the at least one bundled software program by displaying the name and the number on the computer based upon the result from for determining whether bundled software is bundled with the software to be installed,
wherein, based upon a determination that the bundled software does not exist based upon the text information, the at least one program instructs the processor to:
  detect one or more selection boxes on the user interface;
  determine whether a number of the selection boxes on the user interface exceeds a predetermined number;
  acquire a plurality of text contents corresponding to the selection boxes based upon a determination that the number of the selection boxes exceeds the predetermined number;
  analyze whether the plurality of text contents represent installation of the bundle software; and
  based upon the analyzing, extract a keyword from the plurality of text contents, and update the keyword into a first database.

16. The computer storage medium of claim 15, wherein the at least one program instructs the processor to determine whether the bundled software exists by matching the text information with preset text indicating software bundling.

17. The computer storage medium of claim 15, wherein the at least one program instructs the processor to extract the name of the at least one bundled software program based upon a determination that the bundled software exists based upon the text information.

18. The computer storage medium of claim 15, wherein the at least one program instructs the processor to acquire the number of the at least one bundled software program from the text information based upon a determination that the bundled software exists based upon the text information.

19. The computer storage medium of claim 15, wherein the at least one program instructs the processor to determine whether the bundled software exists by matching the text information with preset text indicating software bundling, wherein the preset text includes a text string of "install", a text string of "use", a name of the at least one bundle software program, or a combination thereof.

20. The computer storage medium of claim 15, wherein the at least one program instructs the processor to:
  determine whether the number of the selection boxes on the user interface exceeds one; and
  acquire a plurality of text contents corresponding to the selection boxes upon determining that the number of selection boxes exceeds one.

* * * * *